(12) United States Patent
Graham

(10) Patent No.: US 7,418,973 B2
(45) Date of Patent: Sep. 2, 2008

(54) DEVICE TO REDUCE NOISE IN PRESSURE REGULATORS

(75) Inventor: Gary Ellis Graham, Summerville, SC (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 295 days.

(21) Appl. No.: 11/268,816

(22) Filed: Nov. 8, 2005

(65) Prior Publication Data

US 2007/0102047 A1  May 10, 2007

(51) Int. Cl.
G05D 16/02 (2006.01)

(52) U.S. Cl. ............... 137/15.19; 137/505; 137/505.37; 251/297; 267/179; 267/180

(58) Field of Classification Search ................. 137/15.9, 137/505, 505.37, 505.42, 514, 15.19; 251/297; 267/179, 180
See application file for complete search history.

(56) References Cited

U.S. PATENT DOCUMENTS

| | | | |
|---|---|---|---|
| 2,202,313 A | 5/1940 | Grove | |
| 2,272,243 A * | 2/1942 | Jacobsson et al. | 137/454.5 |
| 2,708,562 A | 5/1955 | Schmid | |
| 3,251,376 A | 5/1966 | Worden | |
| 3,463,183 A | 8/1969 | Wallace | |
| 4,538,645 A * | 9/1985 | Perach | 137/625.65 |
| 4,660,597 A * | 4/1987 | Cowles | 137/505.42 |
| 4,693,267 A | 9/1987 | Patterson | |
| 4,719,940 A | 1/1988 | Beavers | |
| 4,823,828 A | 4/1989 | McGinnis | |
| 5,234,026 A | 8/1993 | Patterson | |
| 5,285,810 A | 2/1994 | Gotthelf | |
| 5,381,819 A | 1/1995 | Gotthelf | |
| 5,606,991 A | 3/1997 | Kuribayashi | |
| 5,755,254 A * | 5/1998 | Carter et al. | 137/340 |
| 5,890,512 A | 4/1999 | Gotthelf et al. | |
| 5,988,204 A | 11/1999 | Reinhardt et al. | |
| 6,820,641 B2 * | 11/2004 | Larsen | 137/491 |
| 2002/0190452 A1 * | 12/2002 | Drager | 267/180 |

FOREIGN PATENT DOCUMENTS

| | | |
|---|---|---|
| EP | 1 087 281 A1 | 3/2001 |
| FR | 1 247 388 A | 12/1960 |
| FR | 2 420 656 A | 10/1979 |

* cited by examiner

Primary Examiner—Stephen M Hepperle
(74) Attorney, Agent, or Firm—RatnerPrestia

(57) ABSTRACT

A pressure regulator comprising a body portion having an inlet port, an outlet port, and a flow passage positioned therebetween is provided. A valve member and a valve seat are positioned in the flow passage. A spring is coupled to the valve member to urge the valve member along an axis towards the valve seat, wherein the flow passage is substantially closed when the valve member engages with the valve seat. The spring has an extended segment in contact with a fixed surface, whereby the extended segment restricts displacement of the spring in a direction substantially perpendicular to the axis.

15 Claims, 3 Drawing Sheets

US 7,418,973 B2

DEVICE TO REDUCE NOISE IN PRESSURE REGULATORS

TECHNICAL FIELD

The present invention relates to a device that is configured to reduce or eliminate noise and damage in a pressure regulator having a valve plug and valve spring arrangement.

BACKGROUND OF THE INVENTION

A pressure regulator is a valve that controls fluid flow from a high pressure source to a low pressure device. Pressure regulators are utilized for various applications including, but not limited to, facilitating the delivery of gas or liquid to a device such as a laser, fuel cell or welding system, for example. The general operation of a pressure regulator and its integral components is described in U.S. Pat. No. 5,381,819, which is incorporated by reference in its entirety.

In a regulator having a valve plug and valve spring arrangement, such as the regulator illustrated in patent application Ser. No. '365, one end of the valve plug, referred to as a stem, travels within an aperture formed in the regulator housing and the other end of the valve plug cooperates with a valve seat to open and close the regulator. The valve plug mates and seals with the valve seat in a "no-flow" state to prevent flow through the regulator. Conversely, the valve plug is sufficiently separated from the valve seat in a "full-flow" state to permit maximum flow through the regulator.

In a "low-flow" state, the valve plug is only slightly separated from the valve seat. The slight separation is sufficient to permit a small volume of fluid to pass between the plug and the seat. Two flow vortexes form on either side of the valve plug which vibrate the valve plug. Since only a slight distance separates the plug and the seat, the vibrating plug repetitively strikes the valve seat. The resulting contact damages the valve plug and the valve seat and generates an undesirable audible noise.

More specifically, the repetitive contact degrades the exterior surfaces of the valve plug and valve seat, thereby diminishing the sealing capacity between the valve plug and the valve seat in the closed position of the regulator. In order to limit the vibration of the plug and eliminate the destructive contact between the valve plug and valve seat, a light interference fit is commonly required between the valve plug stem and the aperture disposed in the regulator housing. Accordingly, the size tolerance of both the housing aperture and the valve plug stem are tightly controlled. In fabrication, such excessive tolerance control may be relatively expensive, difficult to maintain and onerous to inspect.

Thus, there is a need to reduce the noise and damage resulting from the aforementioned valve plug arrangement, while minimizing costs.

SUMMARY OF THE INVENTION

According to one exemplary embodiment, a pressure regulator comprising a body portion having an inlet port, an outlet port, and a flow passage positioned therebetween is provided. A valve member and a valve seat are positioned in the flow passage. A spring is coupled to the valve member to urge the valve member along an axis towards the valve seat, wherein the flow passage is substantially closed when the valve member engages with the valve seat. The spring has an extended segment in contact with a fixed surface, whereby the extended segment restricts displacement of the spring in a direction substantially perpendicular to the axis.

According to another exemplary embodiment, a valve spring configured for use in a pressure regulator is provided. The valve spring comprises a coiled portion extending along an axis configured to exert a spring force along the axis. A base convolution of the coiled portion is configured to contact a fixed surface. A top convolution opposite the base convolution of the coiled portion is configured to bear on a valve member. An extended segment contiguous with the top convolution contacts a fixed surface, whereby when the spring is operatively installed in a pressure regulator the extended segment resists translation of its associated valve member in a direction substantially perpendicular to the axis.

According to yet another exemplary embodiment, a method of installing a valve spring into a pressure regulator is provided. The method comprises the step of positioning an end of the valve spring in contact with a valve member along an axis. The extended segment of the valve spring is positioned in contact with a fixed surface, whereby the extended segment resists translation of its associated valve member in a direction substantially perpendicular to the axis.

BRIEF DESCRIPTION OF THE FIGURES

The invention is best understood from the following detailed description when read in connection with the accompanying drawing. Included in the drawing are the following figures.

DETAILED DESCRIPTION OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

Figure 1:
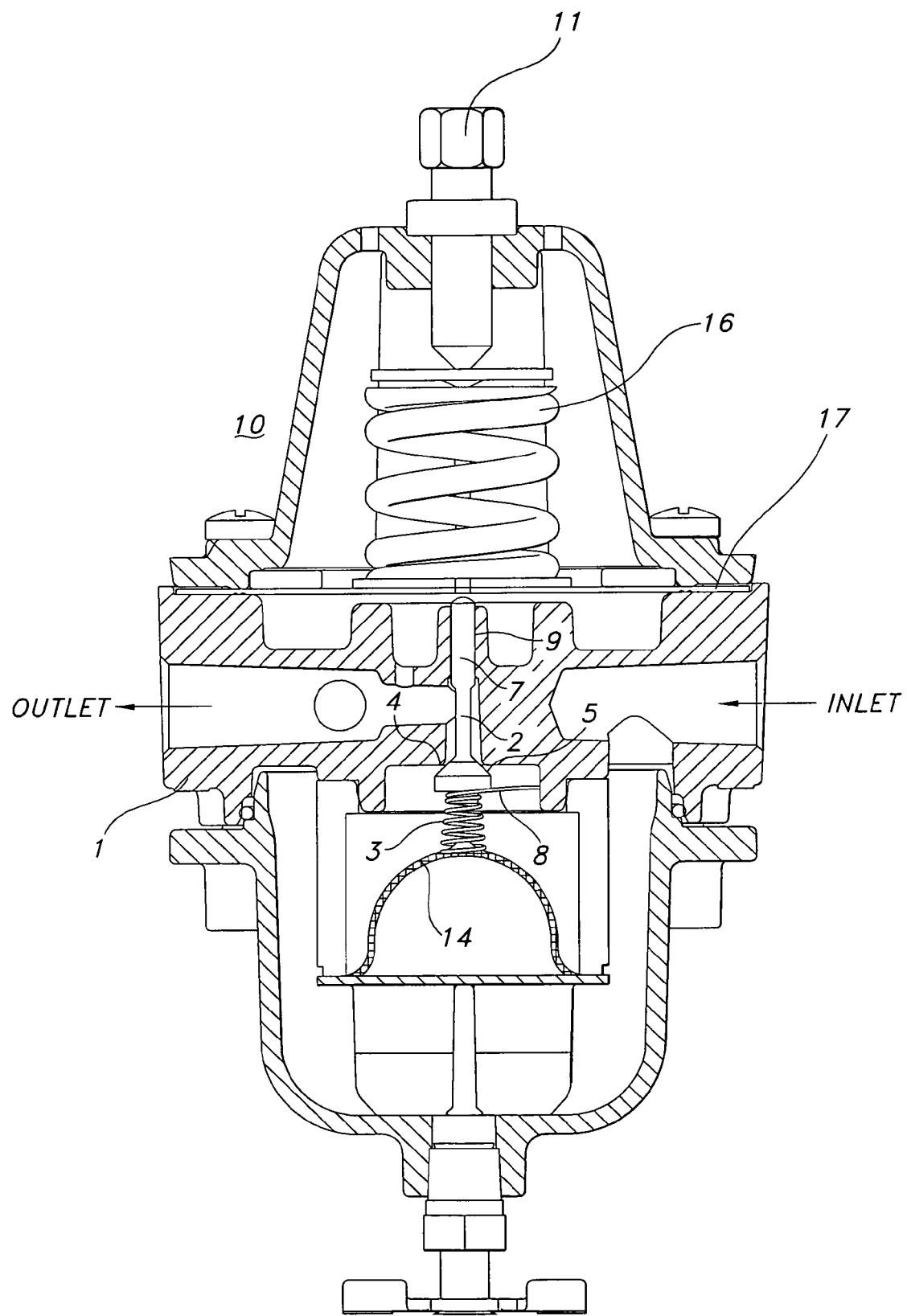
FIG. 1 is a cross-sectional elevation view of an exemplary embodiment of a pressure regulator according to an aspect of this invention.
Figure 2:
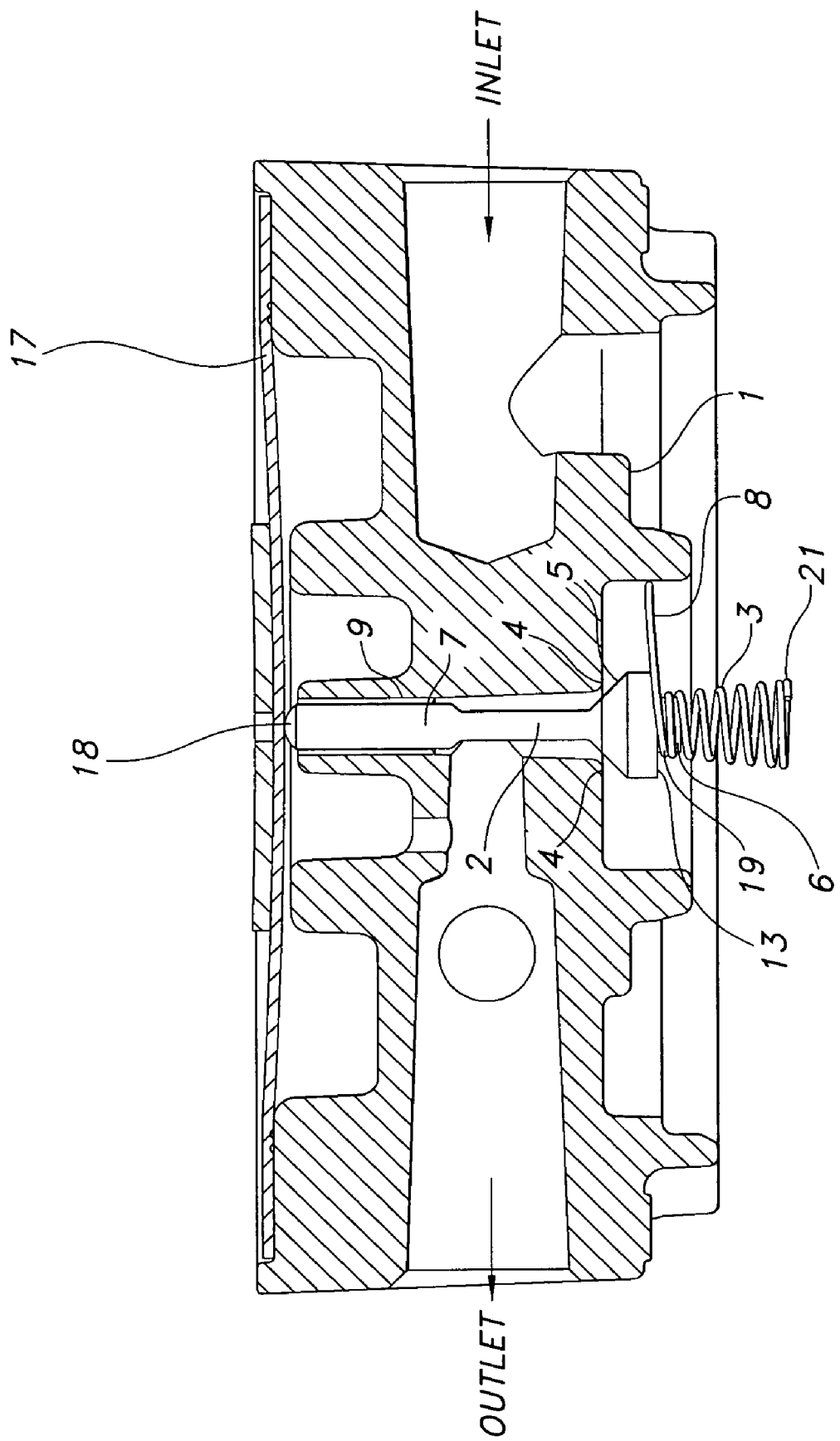
FIG. 2 is a detailed view of the pressure regulator illustrated in FIG. 1, with components omitted for clarity.

Referring specifically to the exemplary embodiment illustrated in FIGS. 1 and 2, a cross-sectional view of a pressure regulator configured to limit internal damage and noise is disclosed. FIG. 1 illustrates the entire pressure regulator designated generally by the numeral 10. The pressure regulator 10 facilitates the controlled delivery of fluid from a high pressure source (e.g. compressed gas tanks, cylinder banks, etc.) to a device operating at a lower pressure (e.g. gas analyzer, laser, fuel cell, welding system, etc.).

The pressure regulator 10 comprises a housing or body portion 1 including an inlet port (labeled "INLET") to accept fluid from the high pressure source, an outlet port (labeled "OUTLET") to deliver fluid to the low pressure device and a flow passage disposed therebetween. A valve plug 2 (also referred to as a plug, valve or valve member), plug spring 3 and a revolved valve seat 4 formed on the housing 1 are positioned in the flow passage and cooperate together to control delivery of fluid through the flow passage of the regulator.

With regard to the general structure of the pressure regulator embodiment illustrated in FIGS. 1 and 2, a user-adjustable screw 11 bears on a spring 16 which flexes a diaphragm 17 against a bearing surface 18 of the valve plug 2. An aperture 9 formed in the housing 1 guides the travel of a stem portion 7 of the valve plug 2. A top convolution 19 of the plug spring 3 bears on a shoulder 13 formed on the valve plug 2. A bottom convolution of the plug spring 3 is grounded on a fixed surface 14 of the housing or other fixedly mounted regulator component.

If the force applied to the diaphragm 17 by the screw 11 is sufficiently greater than the fluid pressure within the flow passage combined with the force applied by the plug spring 3, the diaphragm 17 deflects to translate the valve plug 2 away from the valve seat 4 and compress the plug spring 3. As the valve plug translates away from the valve seat 4, a chamfered portion 5 of the valve plug 2 separates from the valve seat 4 to permit flow through the open flow passage, as illustrated in FIG. 2.

Conversely, if the fluid pressure within the flow passage combined with the force applied by the plug spring 3 is sufficiently greater than the force applied to the diaphragm 17 by the screw 11, the diaphragm returns to a relaxed position (i.e. straight) and the plug spring 3 expands and drives the valve plug 2 toward the valve seat 4. As the valve plug translates towards the valve seat 4, the chamfered portion 5 of the valve plug 2 mates and seals with the valve seat 4 to prevent flow through the closed flow passage, as illustrated in FIG. 1.

According to the exemplary embodiment illustrated in the figures, the plug spring 3 urges the valve plug 2 in substantially perpendicular directions, i.e., the coiled segment 12 of the plug spring 3 urges the plug in a direction along the longitudinal axis of the plug and the extended segment 8 of the spring urges the plug in a lateral direction, substantially perpendicular to the longitudinal axis of the plug. The extended segment 8 is positioned in compressive contact with a wall of housing 1, such that the extended segment 8 of the plug spring 3 maintains a lateral force against the valve plug 2. The extended segment 8 may merely contact a fixed wall of the housing as shown, or, alternatively, the extended segment may extend through a hole disposed in the wall or may be mounted or adhered to the wall. The housing wall may be curved, planar, non-planar or uneven, for example. It should be understood that the aforementioned wall is not limited to a wall of the housing 1, as the wall may be any surface of any fixed component of the regulator. In use, as the coiled segment 12 of the spring expands or compresses, the terminated end of the extended segment 8 may slide along the surface of the wall, or, alternatively, the extended segment may be fixed to the wall.

By virtue of the contact between the extended portion 8 of the plug spring 3 and the coiled portion 1, lateral movement and vibration of the valve stem 7 within the aperture 9 of the housing 1 is restricted and can be substantially prevented, thereby reducing the aforementioned noise and damage to the valve components. Moreover, it has been discovered that in a low flow condition of the regulator, when the chamfered portion 5 of the valve plug 2 is slightly separated from the valve seat 4, the extended segment 8 of the plug spring 3 limits contact between the valve plug 2 and the valve seat 4. More specifically, the extended segment exerts a constant lateral force against the valve plug, such that the valve plug 2 is maintained in a relatively fixed position which reduces the possibility of contact between the two parts. As previously described, in the absence of the extended segment 8 of the plug spring 3, frictional contact between the chamfered surface 5 of the valve plug and the valve seat 4 generates noise and degrades the surfaces of either component thereby upsetting the sealing characteristics of the pressure regulator. By way of non-limiting example, the valve seat 4 and housing may be composed of die cast aluminum and the valve plug may be composed of rubber coated machined brass, however alternative materials and forming processes are contemplated.

In a conventional pressure regulator having a valve plug and valve spring arrangement, the radial gap or clearance between the valve stem and its respective aperture is ordinarily very small to restrict the valve from vibrating against the valve seat. In order to maintain a gap of 0.001", for example, between the valve stem and its respective aperture, the size tolerance of both parts could be on the order of 0.0005" or less. As mentioned previously, it is cost prohibitive and time consuming to fabricate and inspect parts with such excessive tolerances.

In contrast with a conventional pressure regulator, the extended segment 8 of spring 3 of the exemplary embodiment limits the vibration of the valve plug 2. Thus, it is not necessary to unduly constrain the valve stem 7 within the housing aperture 9 by constricting the dimensional tolerances of either part. Moreover, the broad size tolerances of the stem 7 and aperture 9 are not cost prohibitive. Thus, the manufacturer and/or user may recognize a benefit resulting from a cost savings.

Figure 4:
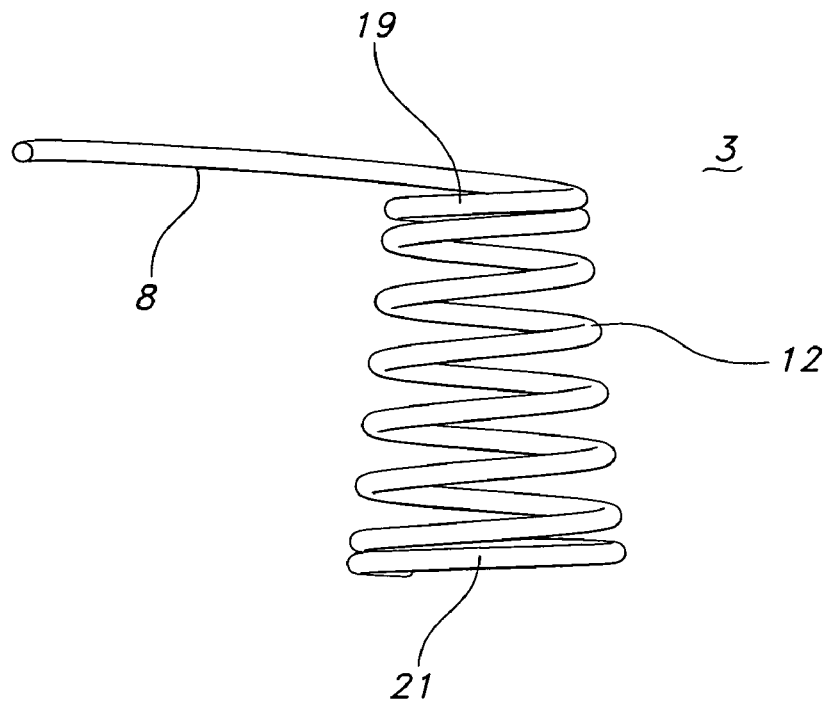
FIG. 4 is an elevation view of the valve spring of FIG. 3.
Figure 3:
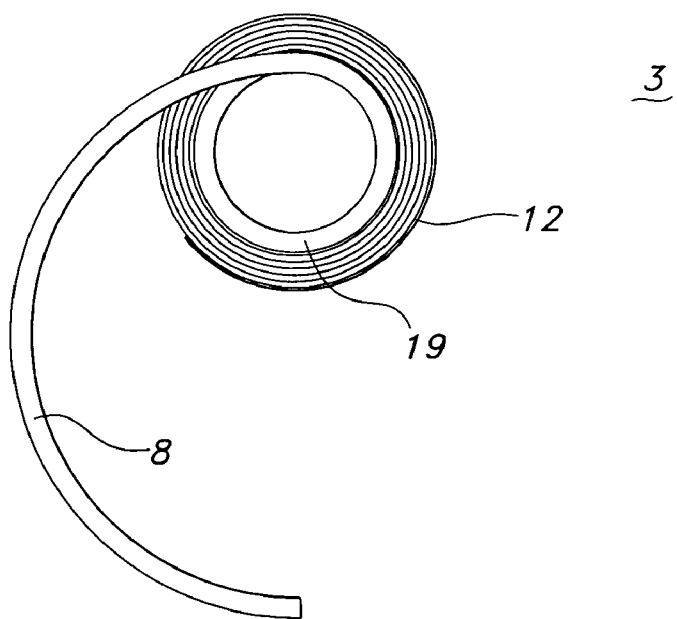
FIG. 3 is a top plan view of a valve spring illustrated in FIG. 1.

An exemplary embodiment of the plug spring 3 is best illustrated in FIGS. 3 and 4. The plug spring 3 comprises an extended segment 8 contiguous with and extending from the top convolution 19 of the coiled segment 12. Although not illustrated, the extended segment 8 may extend from any segment of the spring 3. The coiled segment 12 may be conically shaped, as best shown in FIG. 3. The top convolutions 19 of the conical segment 12 are sized to captivate the cylindrical neck 6 of the valve plug 2 (the cylindrical neck 6 extends from the shoulder 13 of the valve plug 2). The extended segment 8 may be curved as illustrated or substantially straight. According to one exemplary embodiment, a radius of curvature of the extended segment may be about two times greater than the largest radius of curvature of the coiled segment 12. According to another exemplary embodiment, a radius of curvature of the extended segment may be about three times greater than the largest radius of curvature of the coiled segment 12. According to yet another exemplary embodiment, the center of the radius of curvature of the extended segment 8 is not axially or radially aligned with the center of the radius of curvature of the coiled segment 12. Although not illustrated herein, the extended segment 8 may be substantially straight and simply coiled at its terminated end.

The extended segment 8 of the spring can be formed by standard spring fabrication equipment, as no special or unique tooling is required. The plug spring 3 is optionally formed from stainless steel, spring steel, or any other resilient material. The plug spring 3 is not limited to a conical spring style as shown, as the spring may be a compression spring, torsion spring, or any other style of spring.

In assembly of the regulator, the top convolutions 19 of the plug spring 3 are expanded and slid over the cylindrical neck 6 of the valve plug 2, such that the spring firmly compresses the neck 6 of the plug. The stem 7 of valve plug 2 is inserted into the aperture 9 of the housing, which may be inverted for ease of assembly. The extended segment 8 of the plug spring 3 is positioned in compressive contact with a wall of the housing. The regulator is thereafter inverted to assemble other parts onto the regulator. Since the extended segment 8 of the spring is positioned in compressive contact with the housing and the plug spring 3 is compressively coupled to the valve plug 2, the valve plug and spring can not fall from the housing as the housing is inverted to an upright position. In contrast, in a conventional regulator application, the product assembler may be required to maintain the plug in place by hand or by other means so that the valve plug and spring remain in position.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A pressure regulator comprising:
   a housing having an inlet port, an outlet port, and a flow passage positioned between said inlet port and said outlet port;
   a valve member and a valve seat positioned in said flow passage, wherein said flow passage is substantially closed when said valve member engages said valve seat and said flow passage is substantially open when said valve member is spaced from said valve seat;
   a spring coupled to said valve member to urge said valve member along an axis towards said valve seat; and
   said spring having a first bearing surface contacting said valve member, a second bearing surface contacting a surface of the housing, and an extended segment extending from said first bearing surface and positioned in contact with a surface of said housing, said extended segment restricting displacement of said valve member in a direction substantially perpendicular to said axis.

2. The pressure regulator of claim 1 wherein said extended segment extends beyond a coiled portion of said spring measured along a plane perpendicular to said axis.

3. The pressure regulator of claim 2 wherein a radius of curvature of said extended segment of said spring is greater than a radius of curvature of said coiled portion of said spring.

4. The pressure regulator of claim 3 wherein a center of said radius of curvature of said extended segment is not aligned with a center of said radius of curvature of said coiled portion.

5. The pressure regulator of claim 3, wherein said radius of curvature of said extended segment of said spring is at least about two times greater than said radius of curvature of said coiled portion of said spring.

6. The pressure regulator of claim 3, wherein said radius of curvature of said extended segment of said spring is at least about three times greater than said radius of curvature of said coiled portion of said spring.

7. The pressure regulator of claim 2, said coiled portion of said spring having a conical shape.

8. A method of installing a valve spring into a pressure regulator housing comprising the steps of:
   positioning a first bearing surface of the valve spring in contact with a valve member along an axis;
   positioning a second bearing surface of the valve spring in contact with a surface of the housing, such that the valve spring is positioned between the housing surface and the valve member for biasing the valve member along the axis;
   positioning an extended segment of the valve spring in contact with a surface of the housing, wherein the extended segment of the valve spring extends from the first bearing surface of the valve spring, and whereby the extended segment of the valve spring resists translation of its associated valve member in a direction substantially perpendicular to the axis.

9. The method of claim 8 further comprising the step of coupling the valve spring to the valve member.

10. A pressure regulator comprising:
    a body portion having an inlet port, an outlet port, and a flow passage positioned between said inlet port and said outlet port;
    a valve member and a valve seat positioned in said flow passage;
    a spring coupled to said valve member to urge said valve member along an axis towards said valve seat, wherein said flow passage is substantially closed when said valve member engages with said valve seat; and
    said spring having an extended segment in contact with a fixed surface, said extended segment restricting displacement of said valve member in a direction substantially perpendicular to said axis, wherein said extended segment extends beyond a coiled portion of said spring measured along a plane perpendicular to said axis.

11. The pressure regulator of claim 10 wherein a radius of curvature of said extended segment of said spring is greater than a radius of curvature of said coiled portion of said spring.

12. The pressure regulator of claim 11 wherein a center of said radius of curvature of said extended segment is not aligned with a center of said radius of curvature of said coiled portion.

13. The pressure regulator of claim 11 wherein said radius of curvature of said extended segment of said spring is at least about two times greater than said radius of curvature of said coiled portion of said spring.

14. The pressure regulator of claim 11 wherein said radius of curvature of said extended segment of said spring is at least about three times greater than said radius of curvature of said coiled portion of said spring.

15. The pressure regulator of claim 10, said coiled portion of said spring having a conical shape.

* * * * *